(12) United States Patent
Rimer et al.

(10) Patent No.: US 11,866,325 B2
(45) Date of Patent: Jan. 9, 2024

(54) SYNTHESIS OF MORDENITE USING MULTIPLE ORGANICS

(71) Applicant: University of Houston System, Houston, TX (US)

(72) Inventors: Jeffrey D. Rimer, Houston, TX (US); Manjesh Kumar, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 363 days.

(21) Appl. No.: 17/054,861

(22) PCT Filed: May 15, 2019

(86) PCT No.: PCT/US2019/032450
§ 371 (c)(1),
(2) Date: Nov. 12, 2020

(87) PCT Pub. No.: WO2019/222371
PCT Pub. Date: Nov. 21, 2019

(65) Prior Publication Data
US 2021/0214237 A1 Jul. 15, 2021

Related U.S. Application Data

(60) Provisional application No. 62/672,291, filed on May 16, 2018.

(51) Int. Cl.
*C01B 39/26* (2006.01)

(52) U.S. Cl.
CPC ........ *C01B 39/265* (2013.01); *C01P 2002/01* (2013.01); *C01P 2002/72* (2013.01); *C01P 2002/85* (2013.01); *C01P 2004/04* (2013.01); *C01P 2004/24* (2013.01); *C01P 2004/64* (2013.01)

(58) Field of Classification Search
CPC .................................... C01B 39/265
See application file for complete search history.

(56) References Cited

U.S. PATENT DOCUMENTS

2015/0360964 A1* 12/2015 Rimer .................... C30B 29/34
423/700

OTHER PUBLICATIONS

Kumar et al, SSZ-13 Crystallization by Particle Attachment and Deterministic Pathways to Crystal Size Control, 2015, American Chemical Society, 137, 13007-13017 (Year: 2015).*

* cited by examiner

*Primary Examiner* — James A Fiorito
(74) *Attorney, Agent, or Firm* — Jackson Walker LLP (57) ABSTRACT

The methods for synthesizing mordenite (MOR) zeolite crystals described herein utilize a combination of organics and produce MOR crystals with reduced size, higher Si/Al ratio, fewer stacking faults, less occluded organics in the final product, and a longer catalyst lifetime.

12 Claims, 8 Drawing Sheets

SYNTHESIS OF MORDENITE USING MULTIPLE ORGANICS

This application claims priority to U.S. Provisional Patent Application Ser. No. 62/672,291, entitled "Synthesis of Mordenite Using Multiple Organics," filed May 16, 2018, the entire contents of which are hereby incorporated by reference.

BACKGROUND

This disclosure pertains to the synthesis of nanosized zeolite crystals.

The increasing demand for nanosized zeolite catalysts has created a need to develop novel synthesis approaches capable of tailoring crystal properties and generating more efficient materials. Among many physicochemical properties of zeolites, crystal size plays a significant role in mediating internal mass transport and thereby altering the catalyst lifetime and/or selectivity. Various approaches have been explored to selectively tune the anisotropic growth rate of zeolite crystals by altering synthesis conditions or introducing additives such as modifiers, organic structure-directing agents (OSDAs), and crystalline seeds. Often these approaches are limited by their commercial viability and reproducibility. Achieving potential targets can be even more challenging owing to the poor understanding of mechanistic pathways for crystal growth.

SUMMARY

The present disclosure relates generally to the synthesis of zeolite crystals. In particular, the present disclosure relates to a synthetic route for the preparation of zeolite mordenite (MOR) materials with ultrathin dimensions.

Mordenite is a large pore zeolite (pore diameter ca. 0.67 nm) with unidirectional channels aligned along the c-axis. Mordenite is used as a commercial catalyst in reactions that include dehydration (e.g, ethanol to ethylene), oxidation (methane to methanol), (hydro)isomerization, cracking, alkylation, and carbonylation. Prior studies have attributed the catalytic activity of this framework to intersections generated by the crossover of 12-membered ring (MR) channels with 8-MR channels, generating pockets within the framework that facilitate shape-selective reactions; however, MOR is highly susceptible to coking (i.e., deactivation) owing to its 1-dimensional pore geometry and large channels that accommodate the formation of large aromatics. To this end, generating crystals with reduced dimensions is critical to improved on-stream lifetime. Nominally MOR crystals are prepared with sizes that range from 5 to 20 µm. Sizes as small as 40-60 nm have been reported using a complex synthesis method that includes the use of an alcohol additive, microwave heating, and crystalline seeds. MOR nanorods (ca. 100-200 nm) have been synthesized using seeds and cationic multivalent surfactants, respectively. Alternative approaches to reduce internal diffusion include post-synthesis modification to introduce mesopores. In these collective approaches, the final product consists of nanometer-sized domains within larger aggregates. Thus, the generation of dispersed ultrathin mordenite crystals remains elusive.

Organic structure-directing agents (OSDAs) are commonly employed in zeolite synthesis as a means of regulating the kinetics of crystallization. OSDAs are molecules with a size and shape that is commensurate with the cages/channels of zeolites, and thus facilitate the generation of porous structures. The majority of OSDAs become occluded within the framework and must be removed by calcination. It is common practice that a single OSDA is used to obtain a particular zeolite framework structure. OSDAs can form clusters (e.g., dimers or larger aggregates) to stabilize the framework, and in select cases syntheses may employ two or more different OSDAs. Past examples of the latter include the use of two organics where only one functions as the OSDA and the other alters crystal size or habit (i.e., the presence of a second OSDA is not required for crystal formation). Combinations of OSDAs have been used to prevent polymorphism to achieve higher purity product; and in select cases, two organics may be necessary to achieve a particular crystalline phase. In such cases, the OSDAs act cooperatively to produce a product that otherwise could not be achieved with either individual OSDA.

The present disclosure relates to a novel technique to synthesize MOR crystals with dimensions less than 100 nm. The synthesis method relies on the use of two or more organics. In preferred embodiments, a cooperative set of OSDAs is used for the synthesis of MOR: N, N, N-trimethyl-1-1-adamantammonium (TMAda) in combination with at least one alcohol such as 1,2-hexanediol ($D6_{1,2}$). These two or more organics are used in combination in a growth solution. The OSDAs, and particularly the alcohol, have a hydrophobic alkyl tail and hydrophilic hydroxyl functional groups. When using a combination of both organics at a suitable ratio (for example, TMAda with excess $D6_{1,2}$), ultrathin MOR crystals (referred to as HOU-4) are obtained with an average thickness of 60-80 nm. When growth mixtures are prepared using TMAda as the sole organic, the final product is zeolite SSZ-13 (CHA). In the absence of any organic or in the presence of only alcohols, the final product is zeolite ZSM-5 (MFI). This indicates that the presence of both organics is necessary for the formation of MOR nanosheets.

Zeolite crystal size can impact catalyst lifetime by providing either short or long residence times (i.e., diffusion path length within the pores). Longer residence time tends to favor the formation of carbonaceous deposits (i.e., coke) that deactivates catalysts. The present synthesis method allows for dramatic changes in crystal, leading to ultrathin crystals with thicknesses in the range of 60-100 nm. Comparisons of these materials with conventional MOR catalysts reveals an approximate two-fold increase in lifetime (e.g., for tests using cumene cracking as a model reaction). This approach also tends to generate more individual crystals rather than aggregates of crystals with small subdomain sizes. Moreover, X-ray diffraction patterns show no evidence that HOU-4 has stacking faults, which are commonly reported in literature for MOR crystals.

Another advantage of this method is the increased silicon content in the final MOR crystalline product. Conventional syntheses of MOR results in materials with a Si/Al molar ratio of about 7. HOU-4 obtained using the present method have an average Si/Al ratio of 10. Collectively, the present synthesis method involving the combination of at least two organics can alter the physicochemical properties of zeolite MOR crystals in ways that are more beneficial to applications in catalysis and possibly others (e.g., adsorption, separations, etc.). The combination of organics used for this synthesis lead to a relatively small occlusion of OSDAs within the MOR channels, thus allowing for the recovery and recycling of organics post-synthesis. A one pot synthesis approach makes the process more economical compared to alternative techniques. The present synthesis methods address limitations in conventional MOR syntheses for obtaining ultrasmall crystals using a commercially-viable approach.

DETAILED DESCRIPTION OF PREFERRED EMBODIMENTS

The present disclosure relates to methods for the synthesis of mordenite (MOR) crystals in sub-micron sizes.

Figure 1A:
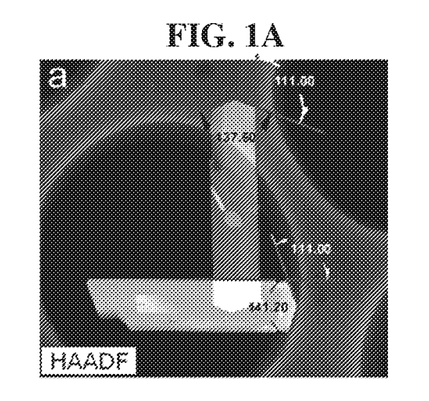
FIG. 1A shows an electron micrograph and dihedral angle measurements of nanosheets of mordenite (MOR).
Figure 1B:
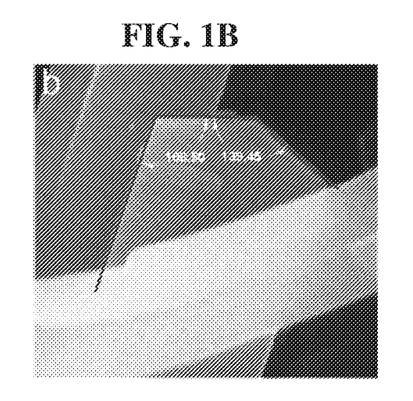
FIG. 1B shows an electron micrograph and dihedral angle measurements of nanosheets of mordenite (MOR).
Figure 1C:
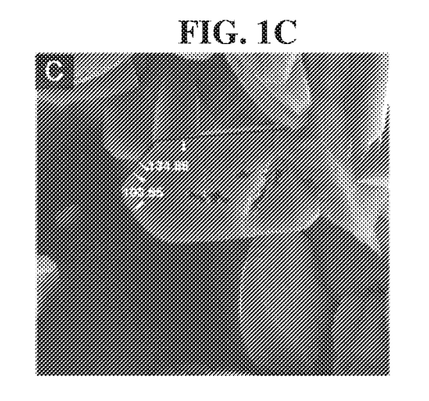
FIG. 1C shows an electron micrograph and dihedral angle measurements of conventional MOR.
Figure 1D:
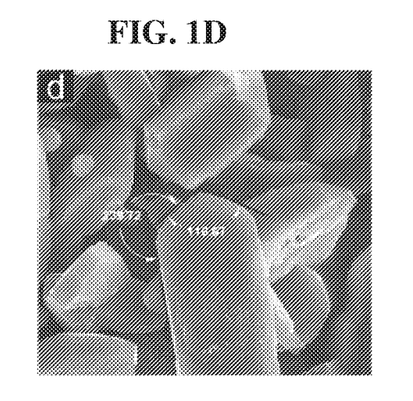
FIG. 1D shows an electron micrograph and dihedral angle measurements of conventional MOR.

Preferred embodiments described herein relate to methods for synthesizing MOR using N, N, N-trimethyl-1-1-adamantammonium (TMAda) in combination with at least one alcohol (preferably 1,2-hexanediol, $D6_{1,2}$) as organic structure-directing agents (OSDAs) in a growth solution where at least one of the OSDAs has a hydrophobic alkyl tail and hydrophilic hydroxyl functional groups. In preferred embodiments, this synthetic method produces ultrathin MOR crystals (HOU-4). These crystals exhibit the typical hexagonal habit where the thickness can range from about 50 nm to about 1 μm and the average length-to-width aspect ratio is 4.0±0.7. FIGS. 1A and 1B show electron micrographs and angle measurements of HOU-4. FIGS. 1C and 1D show electron micrographs and angle measurements of conventional MOR.

Figure 2A:
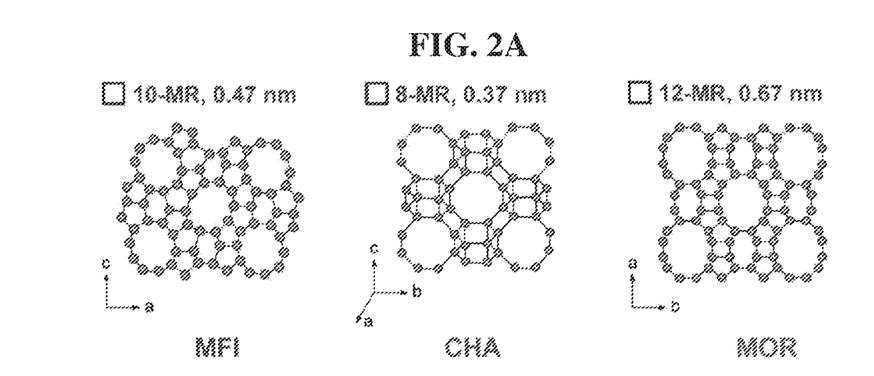
FIG. 2A shows the crystal structures of zeolites MFI, CHA, and MOR (from left to right).
Figure 2B:
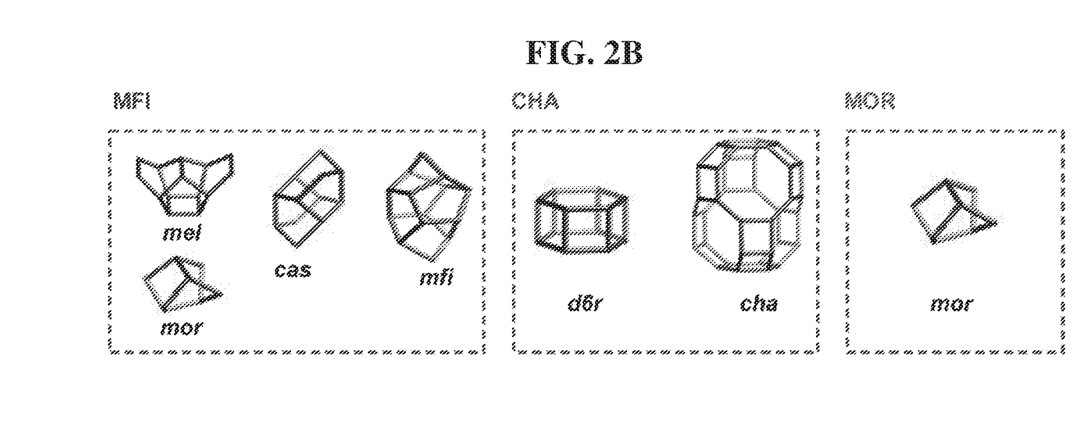
FIG. 2B shows composite building units corresponding to the three different zeolite frameworks (MFI, CHA, and MOR, respectively).

The synthesis mixture utilized in preferred embodiments may also include sodium as an inorganic structure-directing agent (SDA) that yields the zeolite ZSM-5 (MFI) in the absence of organics. Introduction of $D6_{1,2}$ to this synthesis mixture does not alter the crystal structure, but does lead to changes in crystal size and morphology. The use of TMAda as a sole SDA is well documented to yield zeolite SSZ-13 (CHA). It is interesting to note that each SDA and their binary combination generate three very different zeolite frameworks. MFI is a 3-dimensional medium-pore zeolite; CHA is a 3-dimensional small-pore zeolite; and MOR is a 1-dimensional large-pore zeolite. FIG. 2A shows general representations of the crystal structures zeolites MFI, CHA, and MOR. The composite building units (CBUs) of these three structures are vastly different, with the exception of the mor oligomer being shared by both MFI and MOR. FIG. 2B shows composite building units corresponding to the three different zeolite frameworks (MFI, CHA, and MOR, respectively). There are no known reported examples of situations where three different zeolites can be prepared from the same synthesis condition using two OSDAs. Moreover, comparatively few zeolite syntheses employ alcohols as OSDAs, which is a unique aspect of HOU-4 crystallization as described herein.

Figure 2C:
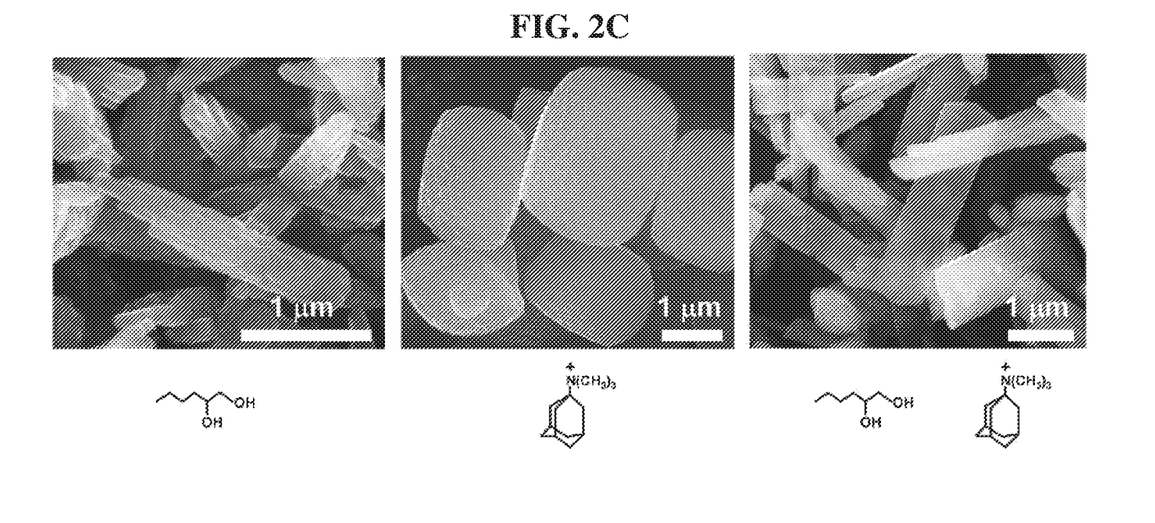
FIG. 2C shows electron scanning micrographs of the three different zeolites (MFI, CHA, and MOR respectively) obtained using three different combinations of organics.

All three zeolites (MFI, CHA, and MOR) have approximately the same Si/Al ratio, as shown in Table 1 below (showing the elemental analysis of various zeolite frameworks using energy-dispersive X-ray spectroscopy (EDX)), but differ with respect to crystal size and shape and the quantity of occluded OSDA. SSZ-13 crystals have a spheroidal morphology with sizes of 1-2 μm and about 10 wt % occluded OSDA (1.3 TMAda per unit cell). MFI crystals are rough, lack a distinct morphology, exhibit sub-micron dimensions, and contain about 5 wt % occluded OSDA (2.65 $D6_{1,2}$ per unit cell). FIG. 2C shows electron scanning micrographs of the three different zeolites (MFI, CHA, and HOU-4, respectively) obtained using three different combinations of organics.

TABLE 1

| Sample | EDX analysis Si/Al |
|---|---|
| HOU-4 | 9.5 |
| MOR | 8.0 |
| SSZ-13 | 11.6 |
| MFI | 11.7 |

Thermogravimetric analysis (TGA) of HOU-4 indicate much less occluded OSDA (about 4 wt %). To test this, HOU-4 samples were prepared by extracting solids from the supernatant without washing, after which occluded $D6_{1,2}$ was also observed by solid-state $^{13}C$ MAS NMR. In washed samples, the weight loss is attributed to about 0.56 TMAda per unit cell. This is shown in Table 2 below. The facile extraction of OSDA molecules from zeolite frameworks without post-synthesis calcination is uncommon, but it provides a method of recovering and potentially recycling the OSDA(s).

TABLE 2

| Framework | Unit cell | Molecular wt/unit cell | % weight loss (TGA) | SDA/unit cell |
|---|---|---|---|---|
| SSZ-13 | $Na_3Al_3Si_{33}O_{72}$ | 2228.52 | 10 | 1.28 |
| MFI | $Na_8Al_8Si_{88}O_{192}$ | 5942.72 | 5 | 2.65 |
| HOU-4 | $Na_5Al_5Si_{43}O_{96}$ | 2993.24 | 3.5 | 0.56 |

Accordingly, preferred embodiments described herein relate to methods for synthesizing zeolites having MOR framework by preparing a synthesis mixture by combining N, N, N-trimethyl-1-1-adamantammonium (TMAda), at least one alcohol (preferably 1,2-hexanediol, $D6_{1,2}$), a sodium source, an aluminum source, and a silica source at room temperature, then allowing the MOR crystals to form and separating them from the remaining synthesis mixture. In certain embodiments, the synthesis mixture is heated, stirred, rotated under pressure, and/or centrifuged in order to produce the MOR crystals. Suitable sodium sources include sodium halides, sodium nitrate, and sodium hydroxide. Suitable aluminum sources include sodium aluminate, aluminum isopropoxide, alumina, aluminum sulfate, and natural sources (e.g. boehmite). Suitable silica sources include sodium silicate, colloidal silicates, fumed silica, silica glass, and tetraethylorthosilicate. In preferred embodiments the sodium source may be sodium hydroxide, the aluminum source may be aluminum hydroxide, and the silica source may be fumed silica. In further preferred embodiments, the MOR crystals are HOU-4 (ultrathin crystals). In additional preferred embodiments, after separation of the MOR crystals from the remaining synthesis mixture, the MOR crystals are washed with a solvent to remove any remaining N, N-trimethyl-1-1-adamantammonium (TMAda) or alcohol. In certain embodiments, the solvent is water. In further preferred embodiments, the N, N-trimethyl-1-1-adamantammonium (TMAda) and alcohol are combined in the synthesis mixture with an excess of alcohol (preferably $D6_{1,2}$), preferably at a ratio of about 1.5 to 16.0 of alcohol to N, N-trimethyl-1-1-adamantammonium (TMAda). In another preferred embodiment, a reduction in the water content of the synthesis composition can lead to thinner HOU-4 crystals. In additional preferred embodiments, the MOR crystals obtained have dimensions of less than 100 nm, and HOU-4 may have an average thickness of 60-80 nm. In additional preferred embodiments, HOU-4 has a Si/Al ratio of about 10.

EXAMPLES

The following chemicals were used as reagents: Cab-O-Sil (M-5, Spectrum Chemical), sodium hydroxide (98% pellets, MACRON Fine Chemicals), N,N,N-trimethyl-1-1-adamantammonium hydroxide (25 wt % in water, SACHEM Inc.), 1,2-hexanediol ($D6_{1,2}$, 98%) and aluminum hydroxide (80.3 wt % Al(OH)3, SPI0250 hydrogel). Deionized (DI) water used in all experiments was purified with an Aqua Solutions RODI-C-12A purification system (18.2 MΩ). All reagents were used as received without further purification.

HOU-4 (MOR-type) crystals were synthesized with the OSDA N,N,N-trimethyl-1-1-adamantammonium hydroxide (TMAda-OH) and 1,2-hexanediol ($D6_{1,2}$) using solutions with a molar composition of 0.052 Al(OH)$_3$:1.0 SiO$_2$:0.2 NaOH:44 H$_2$O:0.1 TMAda-OH:1.6 1,2-hexanediol. Sodium hydroxide (0.09 g, 0.0022 mol) was first dissolved in water (8.21 g, 0.4959 mol), followed by the addition of TMAda-OH (0.95 g, 0.0011 mol) and 1,2-hexanediol (2.17 g, 0.018 mol). This solution was stirred until clear (ca. 15 min). Aluminum hydroxide (0.06 g, 0.0005 mol) was added to the solution and left to stir for another 15 min at room temperature. To this clear solution was added the silica source (0.67 g, 0.0112 mol), and the resulting mixture was stirred (400 rpm) for 4 h at 80° C. (mineral oil bath). Approximately 10 g of growth solution after 4 h of heating under stirring was placed in a Teflon-lined stainless steel acid digestion bomb (Parr Instruments) and was heated under rotation (~30 rpm) and autogenous pressure in a Thermo-Fisher Precision Premium 3050 Series gravity oven. The nominal time and temperature for MOR synthesis was 6 days at 180° C. The products of all syntheses were isolated as white powder (ca. 600 mg) by centrifuging the mother liquor (13,000 rpm for 45 min) for three cycles with DI water washes. Samples for microscopy were prepared by first redispersing a small amount of powder (ca. 5 mg) in DI water. An aliquot of this solution was placed on a glass slide and dried overnight. Crystals were transferred to metal sample disks for microscopy studies by contacting the glass slide with carbon tape for SEM.

Atomic force microscopy (AFM) measurements were performed in air using an Asylum Research MFP-3D-SA instrument (Santa Barbara, CA). An aliquot of HOU-4 crystals dispersed in water was placed on a silicon wafer and was allowed to dry at room temperature. The silicon wafer was calcined at 500° C. for 5 h, followed by cleaning under inert Ar gas flow to remove loosely-bound crystals. AFM images were collected using a Cr/Au-coated silicon nitride cantilever (Olympus RC800PB) with a spring constant of 0.82 N/m. AFM images were collected in contact mode at a scan rate of 1.2 Hz and 256 lines/scan.

Scanning electron microscopy (SEM) was performed with a FEI 235 dual-beam (focused ion-beam) system operated at 15 kV and a 5 mm working distance. All SEM samples were coated with a thin carbon layer (ca. 20 nm) prior to imaging.

Energy-dispersive X-ray spectroscopy (EDX) was performed using a JEOL JSM 6330F field emission scanning electron microscope (SEM) at working distance of 15 mm and voltage of 15 kV and 12 mA. Powder X-ray diffraction (XRD) patterns of as-made zeolite samples were collected on a Siemens D5000 X-ray diffractometer using a Cu Kα source (40 kV, 30 mA). The zeolite frameworks were confirmed using reference patterns provided by the International Zeolite Association Structure Database.

Figure 3A:
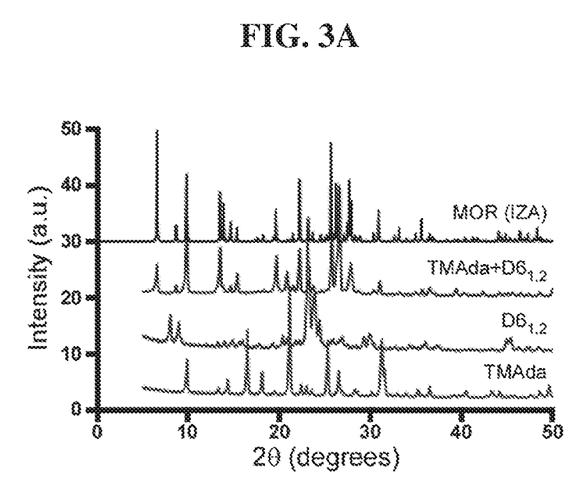
FIG. 3A shows powder X-ray diffraction patterns of the solid precipitate obtained after 6 days of complete crystallization at 180° C., which confirms CHA (SSZ-13) (bottom line), MFI (ZSM-5) (second from bottom line), and MOR (second from top line).
Figure 3B:
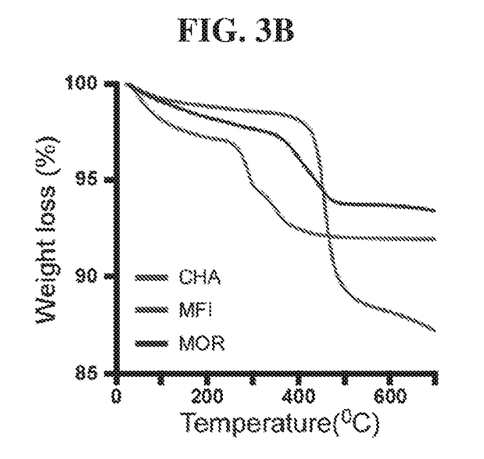
FIG. 3B shows thermogravimetric analysis of washed samples where differences in mass loss are associated with the entrapment of organics within zeolite frameworks.
Figure 3C:
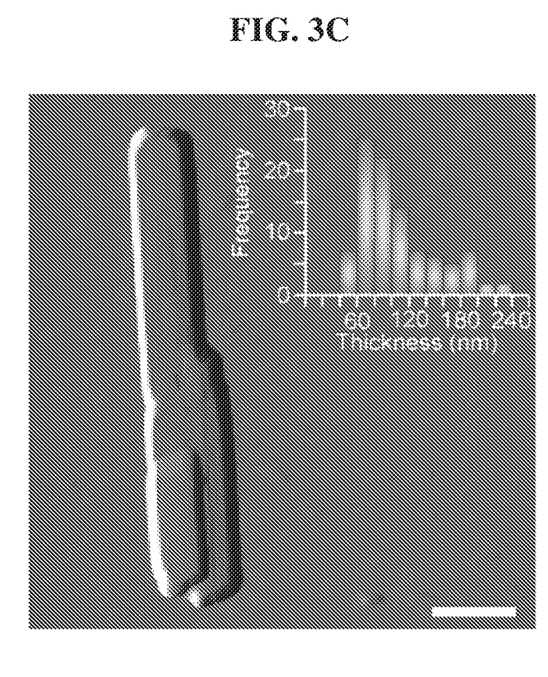
FIG. 3C shows an amplitude mode image of HOU-4 obtained using atomic force microscopy in air and in the inset, a height histogram obtained from the analysis of many HOU-4 crystals using height mode AFM images.

FIG. 3A-3D show results for the characterization of HOU-4 crystals. FIG. 3A shows powder X-ray diffraction patterns of the solid precipitate obtained after 6 days of complete crystallization at 180° C., which confirms SSZ-13 (bottom line), MFI (second from bottom line), and MOR (second from top line). The MOR framework was confirmed using a reference (top line). FIG. 3B shows thermogravimetric analysis showing the entrapment of organics within zeolite frameworks. FIG. 3C shows an amplitude mode image of HOU-4 obtained using atomic force microscopy in air and in the inset, a height histogram of HOU-4 obtained using height mode AFM images. FIG. 3D shows a transmission electron microscopy (TEM) image of HOU-4 depicting orientation of basal plane.

Atomic force microscopy measurements of HOU-4 samples (FIG. 3C) reveal distributions of crystal thickness (FIG. 3C, inset) with an average size of 80 nm. One aspect that distinguishes HOU-4 from nanocrystals reported in literature (or sold by commercial vendors) is that the former are isolated crystals, whereas the latter tend to be large aggregates comprised of small subdomains. As previously mentioned, ns-MOR prepared as described herein are formed via the cooperative action of two OSDAs.

Figure 4A:
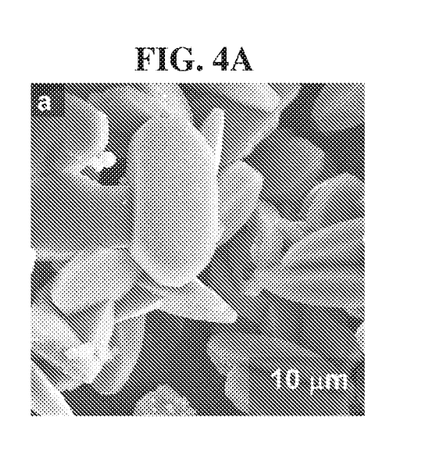
FIG. 4A shows an electron micrograph of conventional mordenite synthesized using a reported protocol.

FIG. 4A shows an electron micrograph of conventional mordenite synthesized using a reported protocol. In one example, a growth mixture that generates HOU-4 is actually one reported for SSZ-13 when TMAda is the sole OSDA. A study was previously published showing that $D6_{1,2}$ is an effective modifier of SSZ-13 crystallization, and at sufficiently low concentrations (i.e., molar ratios less than 1.0 $D6_{1,2}$: 1.0 $SiO_2$) the diol reduces the size of SSZ-13 crystals by an order of magnitude. Here it is shown that increased alcohol concentration (i.e., molar ratios larger than 1.6 $D6_{1,2}$: 1.0 $SiO_2$) shifts the role of diol from that of crystal growth modifier to OSDA.

Figure 4B:
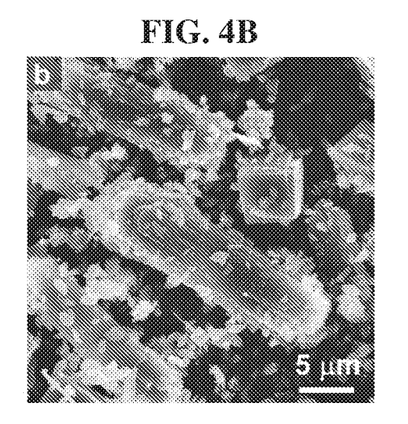
FIG. 4B shows an electron micrograph of crystals obtained using TMAda with 1,2-pentanediol.
Figure 4C:
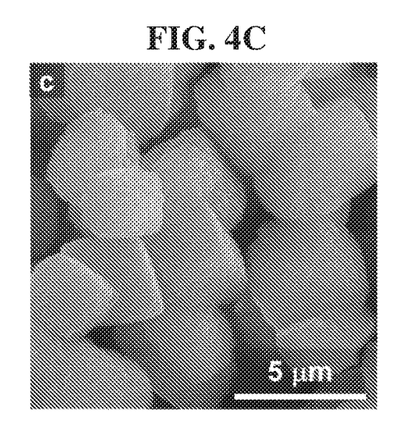
FIG. 4C shows an electron micrograph of crystals obtained using TMAda with 1,2-propanediol.
Figure 4D:
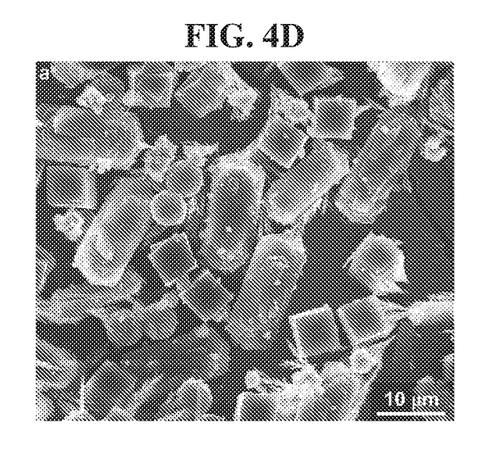
FIG. 4D shows an electron micrograph of MFI crystals obtained using TMAda-OH and butane-1,2-diol.
Figure 4E:
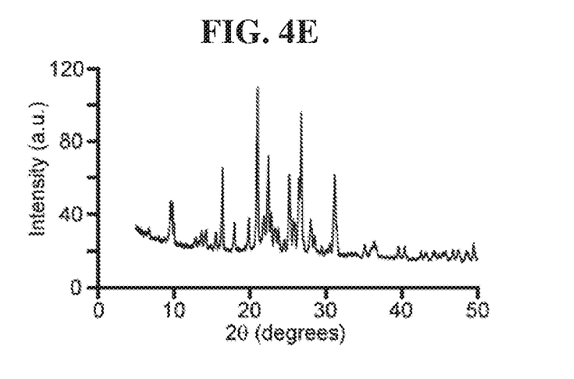
FIG. 4E shows powder X-ray diffraction pattern of the as synthesized product using TMAda-OH and butane-1,2-diol.

The formation of HOU-4 is also highly sensitive to diol selection. Systematic studies of HOU-4 synthesis using diols of varying carbon length reveal that deviations from $C_6$ compromises the purity of the final product. FIG. 4B shows an electron micrograph of crystals obtained using TMAda with 1,2-pentanediol and FIG. 4C shows an electron micrograph of crystals obtained using TMAda with 1,2-propanediol. The former produces mixed phases of MOR and CHA while the latter produces pure CHA. For comparison, FIG. 4D shows an electron micrograph of MFI crystals obtained using TMAda-OH and butane-1,2-diol. FIG. 4E shows powder X-ray diffraction pattern of the as synthesized product using TMAda-OH and butane-1,2-diol. Thus, combinations of TMAda with either 1,2-pentanediol (FIG. 4B) or 1,2-butanediol (FIG. 4D) lead to SSZ-13 impurity, whereas the switch to 1,2-propanediol results in pure SSZ-13 (FIG. 4C).

Figure 5A:
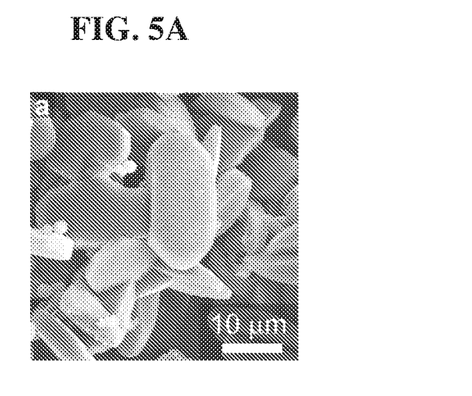
FIG. 5A shows an electron micrograph of conventional MOR crystals obtained using composition 1 (C1) with molar ratio of 6 $Na_2O$:1 $Al_2O_3$:30 $SiO_2$:780 $H_2O$.
Figure 5B:
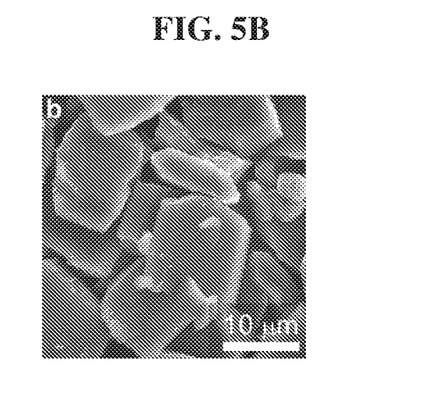
FIG. 5B shows an electron micrograph of MOR crystals obtained using composition 1 with $D6_{1,2}$.
Figure 5C:
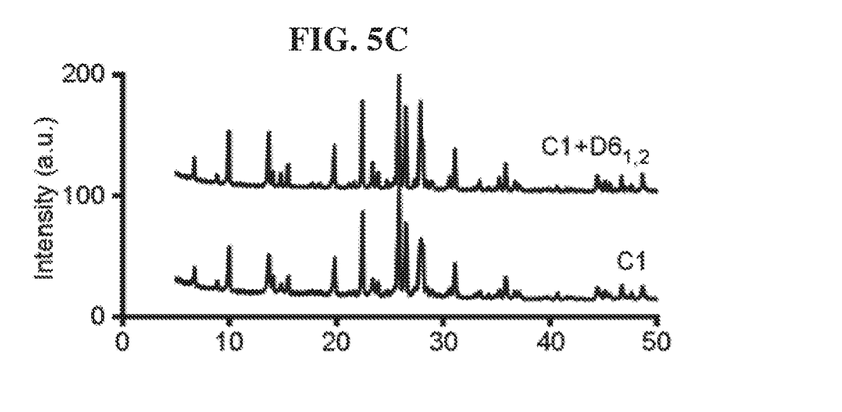
FIG. 5C shows a powder XRD pattern for conventional MOR synthesis with and without $D6_{1,2}$.

The role of TMAda and $D6_{1,2}$ in the formation of ultrathin crystals is seemingly unrelated to growth modification given that conventional MOR synthesis in the presence of organics does not produce thin crystals. In fact, the presence of $D6_{1,2}$ tends to increase the thickness of MOR crystals. FIG. 5A shows an electron micrograph of conventional MOR crystals obtained using composition 1 (C1) with molar ratio of 6 $Na_2O$:1 $Al_2O_3$:30 $SiO_2$:780 $H_2O$. FIG. 5B shows an electron micrograph of MOR crystals obtained using composition 1 with $D6_{1,2}$. FIG. 5C shows a powder XRD pattern for conventional MOR synthesis with and without $D6_{1,2}$.

Figure 6:
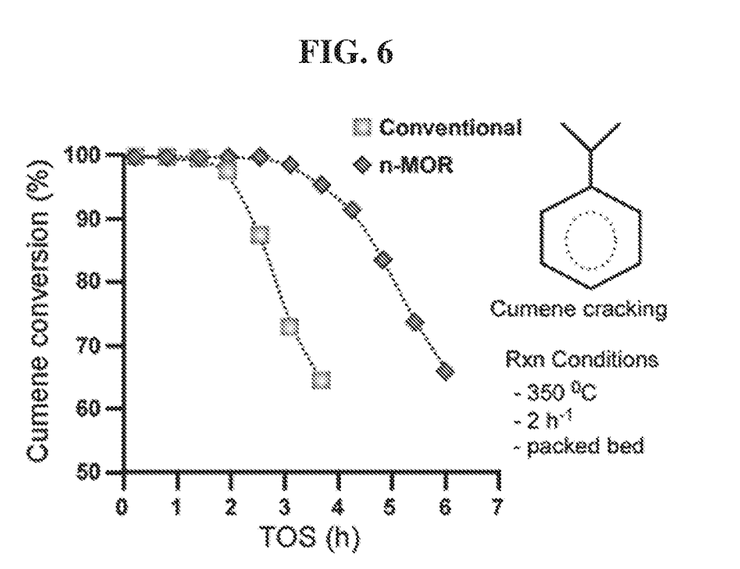
FIG. 6 shows comparative catalytic performance of H-MOR crystals from a conventional synthesis (labeled as MOR) and HOU-4 nanosheets (labeled ns-MOR).

The ability to prepare ultrathin MOR crystals has significant implications for their use in applications such as catalysis. Zeolites such as MOR with low dimension (1D) channels and large (12-MR) pores are highly susceptible to rapid deactivation by coking (i.e., pore blockage due to the retention of carbon deposits). To this end, a reduction in crystal dimension can have a substantial impact on catalyst performance Proton forms of HOU-4 were prepared and their catalytic properties were compared to a conventional MOR catalyst (ca. 5 µm) using cumene cracking as a model reaction to evaluate on-stream lifetime. These studies were conducted at space velocity of 2 $h^{-1}$ and at 350° C. in a packed-bed reactor. FIG. 6 shows comparative catalytic performance of H-MOR crystals from a conventional synthesis (labeled as MOR) and nanosheets (labeled ns-MOR). It was observed that the lifetime of nanosheets (HOU-4) is a factor of two longer (FIG. 6) and has a slower rate of deactivation compared to conventional MOR.

REFERENCES CITED

U.S. Pat. No. 5,215,736
U.S. Pat. No. 4,205,052
U.S. Pat. No. 3,758,667
US Patent Publication No. 2016/0221832
Angew. Chem. Int. Ed., 2013, 52, 10014-10017
J. Mater. Chem. A, 2017, 5, 8887
RSC Adv., 2016, 6, 47623
Micropor. and Mesopor. Mater., 95, 2006, 141-145
Materials Research Bulletin, 46, 2011, 894-900
Microporous and Mesoporous Materials 67 (2004) 19-26
Sci. Adv. Mater. 2009, Vol. 1, No. 1
Corma, A. State of the art and future challenges of zeolites as catalysts. J. Catal. 216, 298-312, doi:10.1016/s0021-9517(02)00132-x (2003).
Pérez-Ramírez, J., Abe116, S., Villaescusa, L. A. & Bonilla, A. Toward Functional Clathrasils: Size- and Composition-Controlled Octadecasil Nanocrystals by Desilication. *Angewandte Chemie International Edition* 47, 7913-7917, doi:10.1002/a nie.200802393 (2008).
Choi, M. et al. Stable single-unit-cell nanosheets of zeolite MFI as active and long-lived catalysts. *Nature* 461, 246-249, doi:10.1038/nature08288 (2009).
Olsbye, U. et al. Conversion of Methanol to Hydrocarbons: How Zeolite Cavity and Pore Size Controls Product Selectivity. *Angew. Chem.-Int. Edit.* 51, 5810-5831, doi: 10.1002/anie.201103657 (2012).
Rimer, J. D., Kumar, M., Li, R., Lupulescu, A. I. & Oleksiak, M. D. Tailoring the physicochemical properties of zeolite catalysts. *Catal. Sci. Technol.* 4, 3762-3771, doi: 10.1039/c4cy00858h (2014).
Bonilla, G. et al. Zeolite (MFI) crystal morphology control using organic structure-directing agents. *Chem. Mat.* 16, 5697-5705, doi:10.1021/cm048854w (2004).
Drews, T. O. & Tsapatsis, M. Progress in manipulating zeolite morphology and related applications. *Curr. Opin. Colloid Interface Sci.* 10, 233-238, doi:10.1016/j.cocis.2005.09.013 (2005).
Lai, Z. P., Tsapatsis, M. & Nicolich, J. R. Siliceous ZSM-5 membranes by secondary growth of b-oriented seed layers. *Adv. Funct. Mater.* 14, 716-729, doi:10.1002/a dfm.200400040 (2004).
Majano, G., Darwiche, A., Mintova, S. & Valtchev, V. Seed-Induced Crystallization of Nanosized Na-ZSM-5 Crystals. *Industrial & Engineering Chemistry Research* 48, 7084-7091, doi:10.1021/ie8017252 (2009).
De Yoreo, J. J. et al. Crystallization by particle attachment in synthetic, biogenic, and geologic environments. *Science* 349, doi:10.1126/science.aaa6760 (2015).
Olafson, K. N., Li, R., Alamani, B. G. & Rimer, J. D. Engineering Crystal Modifiers: Bridging Classical and Nonclassical Crystallization. *Chem. Mat.* 28, 8453-8465, doi:10.1021/a cs.chemmater.6b03550 (2016).
Chiang, H. & Bhan, A. Catalytic consequences of hydroxyl group location on the rate and mechanism of parallel dehydration reactions of ethanol over acidic zeolites. *J. Catal.* 271, 251-261, doi:10.1016/j.jcat.2010.01.021 (2010).
Takahara, I., Saito, M., Inaba, M. & Murata, K. Dehydration of ethanol into ethylene over solid acid catalysts. *Catal. Lett.* 105, 249-252, doi:10.1007/s10562-005-8698-1 (2005).
Grundner, S. et al. Single-site trinuclear copper oxygen clusters in mordenite for selective conversion of methane to methanol. *Nature Communications* 6, doi:10.1038/ncomms8546 (2015).
Sanchez-Castillo, M. A. et al. Reaction kinetics studies and analyses of isobutane conversion over H-mordenite and beta-zeolite. *J. Catal.* 218, 88-103, doi:10.1016/s0021-9517(03)00061-7 (2003).
Rozanska, X., van Santen, R. A., Hutschka, F. & Hafner, J. A periodic DFT study of intramolecular isomerization reactions of toluene and xylenes catalyzed by acidic mordenite. *J. Am. Chem. Soc.* 123, 7655-7667, doi: 10.1021/ja0103795 (2001).

Asuquo, R. A., Edermirth, G. & Lercher, J. A. N-BUTANE ISOMERIZATION OVER ACIDIC MORDENITE. *J. Catal.* 155, 376-382, doi:10.1006/jcat.1995.1219 (1995).

Gora-Marek, K. et al. Hierarchical Mordenite Dedicated to the Fluid Catalytic Cracking Process: Catalytic Performance Regarding Textural and Acidic Properties. *J. Phys. Chem. C* 118, 28043-28054, doi:10.1021/jp510155d (2014).

Vos, A. M. et al. A theoretical study of the alkylation reaction of toluene with methanol catalyzed by acidic mordenite. *J. Am. Chem. Soc.* 123, 2799-2809, doi:10.1021/ja001981i (2001).

Schmitz, A. D. & Song, C. S. Shape-selective isopropylation of naphthalene over dealuminated mordenites. Increasing beta-substitution selectivity by adding water. *Catal. Lett.* 40, 59-65, doi:10.1007/bf00807458 (1996).

Groen, J. C., Sano, T., Moulijn, J. A. & Perez-Ramirez, J. Alkaline-mediated mesoporous mordenite zeolites for acid-catalyzed conversions. *J. Catal.* 251, 21-27, doi: 10.1016/j.jcat.2007.07.020 (2007).

Bhan, A., Allian, A. D., Sunley, G. J., Law, D. J. & Iglesia, E. Specificity of sites within eight-membered ring zeolite channels for carbonylation of methyls to acetyls. *J. Am. Chem. Soc.* 129, 4919-4924, doi:10.1021/ja070094d (2007).

Boronat, M., Martinez-Sanchez, C., Law, D. & Corma, A. Enzyme-like Specificity in Zeolites: A Unique Site Position in Mordenite for Selective Carbonylation of Methanol and Dimethyl Ether with CO. *J. Am. Chem. Soc.* 130, 16316-16323, doi:10.1021/ja805607m (2008).

Hincapie, B. O., Garces, L. J., Zhang, Q. H., Sacco, A. & Suib, S. L. Synthesis of mordenite nanocrystals. *Micropor. Mesopor. Mater.* 67, 19-26, doi:10.1016/j.micromeso.2003.09.026 (2004).

Nosheen, S., Galasso, F. & Suib, S. L. Synthesis of Mordenite Aggregates of Nanometer-Sized Crystallites. *Sci. Adv. Mater.* 1, 31-37, doi:10.1166/sam.2009.1005 (2009).

Ren, L. M. et al. Organotemplate-free and one-pot fabrication of nano-rod assembled plate-like micro-sized mordenite crystals. *J. Mater. Chem.* 22, 6564-6567, doi: 10.1039/c2jm30478c (2012).

Jo, C., Jung, J., Shin, H. S., Kim, J & Ryoo, R. Capping with multivalent surfactants for zeolite nanocrystal synthesis. *Angew. Chem.-Int. Edit.* 52, 10014-10017, doi:10.1002/anie.201303088 (2013).

Li, X. F., Prins, R. & van Bokhoven, J. A. Synthesis and characterization of mesoporous mordenite. *J. Catal.* 262, 257-265, doi:10.1016/j.jcat.2009.01.001 (2009).

van Laak, A. N. C. et al. Mesoporous mordenites obtained by sequential acid and alkaline treatments—Catalysts for cumene production with enhanced accessibility. *J. Catal.* 276, 170-180, doi:10.1016/j.jcat.2010.09.011 (2010).

Lobo, R. F., Zones, S. I. & Davis, M. E. STRUCTURE-DIRECTION IN ZEOLITE SYNTHESIS. *J. Inclus. Phenom. Mol.* 21, 47-78 (1995).

Corma, A. et al. Extra-large pore zeolite (ITQ-40) with the lowest framework density containing double four- and double three-rings. *Proc Natl Acad Sci USA* 107, 13997-14002, doi:10.1073/pnas.1003009107 (2010).

Wu, L. L., Degirmenci, V., Magusin, P., Szyja, B. M. & Hensen, E. J. M. Dual template synthesis of a highly mesoporous SSZ-13 zeolite with improved stability in the methanol-to-olefins reaction. *Chem. Commun.* 48, 9492-9494, doi:10.1039/c2cc33994c (2012).

Camblor, M. A., Corma, A., Diaz-Cabanas, M. J. & Baerlocher, C. Synthesis and structural characterization of MWW type zeolite ITQ-1, the pure silica analog of MCM-22 and SSZ-25. *J. Phys. Chem. B* 102, 44-51, doi:10.1021/jp972319k (1998).

What is claimed is:

1. A method for forming a mordenite (MOR) material, comprising:

combining N, N-trimethyl-1-1-adamantammonium (TMAda), at least one alcohol, a sodium source, an aluminum source, and a silica source at room temperature to form a synthesis mixture, wherein the N, N-trimethyl-1-1-adamantammonium (TMAda) and the at least one alcohol are combined to produce a synthesis mixture comprising an excess of the alcohol relative to the N, N-trimethyl-1-1-adamantammonium (TMAda);

maintaining the synthesis mixture for a time and at a temperature sufficient to allow mordenite (MOR) material to form; and separating the mordenite (MOR) material from the synthesis mixture.

2. The method of claim 1, wherein the at least one alcohol is 1,2-hexanediol ($D6_{1,2}$).

3. The method of claim 1, wherein the N, N-trimethyl-1-1-adamantammonium (TMAda) and the at least one alcohol are combined at a ratio of about 1.5 to 16.0 of the alcohol to the N, N-trimethyl-1-1-adamantammonium (TMAda) in the synthesis mixture.

4. The method of claim 1 wherein the sodium source is sodium hydroxide, the aluminum source is aluminum hydroxide, and the silica source is fumed silica.

5. The method of claim 1 wherein the mordenite (MOR) material is mordenite (MOR) nanosheets.

6. The method of claim 5, wherein the mordenite (MOR) nanosheets have an average thickness of 60-80 nm.

7. The method of claim 1, further comprising the step of washing the mordenite (MOR) material with a solvent after separation from the synthesis mixture.

8. The method of claim 7, wherein the solvent is water.

9. The method of claim 1, wherein crystals in the mordenite (MOR) material have dimensions of less than 100 nm.

10. The method of claim 1, wherein the mordenite (MOR) material has a Si/Al ratio of about 10.

11. The method of claim 1, further comprising one or more of the steps of heating, stirring, rotating under pressure, or centrifuging the synthesis mixture in order to allow the mordenite (MOR) material to form or to separate the mordenite (MOR) material from the synthesis mixture.

12. The method of claim 1, wherein the at least one alcohol is 1,2-hexanediol ($D6_{1,2}$), the sodium source is sodium hydroxide, the aluminum source is aluminum hydroxide, and the silica source is fumed silica, and wherein the synthesis mixture has a molar composition of $Al(OH)_3$:1.0 $SiO_2$:0.2 NaOH:44 $H_2O$:0.1 TMAda-OH:1.6 1,2-hexanediol.

* * * * *

UNITED STATES PATENT AND TRADEMARK OFFICE
CERTIFICATE OF CORRECTION

| | |
|---|---|
| PATENT NO. | : 11,866,325 B2 |
| APPLICATION NO. | : 17/054861 |
| DATED | : January 9, 2024 |
| INVENTOR(S) | : Jeffrey D. Rimer et al. |

It is certified that error appears in the above-identified patent and that said Letters Patent is hereby corrected as shown below:

In the Specification

In Column 1, Line 9 insert -- "This invention was made with government support under Award DE-SC0014468 awarded by the Department of Energy, Basic Energy Sciences. The government has certain rights in the invention." --, therefor.

Signed and Sealed this
Second Day of April, 2024

Katherine Kelly Vidal
*Director of the United States Patent and Trademark Office*